(12) United States Patent
Imamura

(10) Patent No.: US 7,386,167 B2
(45) Date of Patent: Jun. 10, 2008

(54) SEGMENTATION TECHNIQUE OF AN IMAGE

(75) Inventor: Atsushi Imamura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 448 days.

(21) Appl. No.: 11/148,385

(22) Filed: Jun. 9, 2005

(65) Prior Publication Data
US 2006/0018533 A1 Jan. 26, 2006

(30) Foreign Application Priority Data
Jul. 21, 2004 (JP) .............................. 2004-212541

(51) Int. Cl.
*G06K 9/34* (2006.01)
(52) U.S. Cl. .................................... 382/164
(58) Field of Classification Search ................. 382/164
See application file for complete search history.

(56) References Cited

U.S. PATENT DOCUMENTS

| | | | | | |
|---|---|---|---|---|---|
| 5,263,095 | A | * | 11/1993 | Kitamura | 382/164 |
| 5,386,483 | A | * | 1/1995 | Shibazaki | 382/162 |
| 5,630,037 | A | * | 5/1997 | Schindler | 345/592 |
| 5,659,490 | A | * | 8/1997 | Imamura | 358/500 |
| 5,668,896 | A | * | 9/1997 | Kitamura et al. | 382/282 |
| 5,719,639 | A | * | 2/1998 | Imamura | 348/577 |
| 5,828,779 | A | * | 10/1998 | Maggioni | 382/165 |
| 5,887,073 | A | * | 3/1999 | Fazzari et al. | 382/110 |
| 6,021,221 | A | * | 2/2000 | Takaha | 382/199 |
| 2002/0021834 | A1 | * | 2/2002 | Kojima et al. | 382/164 |
| 2002/0146167 | A1 | * | 10/2002 | Imamura et al. | 382/164 |
| 2002/0181768 | A1 | * | 12/2002 | Kim et al. | 382/165 |
| 2003/0059103 | A1 | * | 3/2003 | Shiomi et al. | 382/144 |

FOREIGN PATENT DOCUMENTS

CN 1335728 A 2/2002
JP 2002-259967 9/2002

OTHER PUBLICATIONS

Kurugollu, Color image segmentation using histogram multithresholding and fusion, Nov. 1, 2001, Elsevier Image and Vision Computing, pp. 915-928.*

* cited by examiner

*Primary Examiner*—Jingge Wu
*Assistant Examiner*—Max Shikhman
(74) *Attorney, Agent, or Firm*—McDermott Will & Emery LLP

(57) ABSTRACT

The present invention provides a technique to improve reliability of area segmentation result of an image into a plurality of image areas. A plurality of representative colors and a weight associated with each of the representative colors are determined. A weighted color difference index values associated with the representative colors are calculated according to the weights, respectively, with respect to each pixel constituting the image. The weighted color difference represents difference in color between an individual color representing color of each pixel constituting the image and each of the representative colors. Then, according to the weighted color difference index values, color of each pixel is classified into one of representative color regions associated with the representative colors, to perform segmentation of the image into the plurality of image areas.

10 Claims, 11 Drawing Sheets

| BASE RESIST REGION RBR: | REGION FOR WHICH RESIST IS COATED ON THE BOARD BASE |
| --- | --- |
| PATTERN RESIST REGION RPR: | REGION FOR WHICH RESIST IS COATED ON THE COPPER WIRING PATTERN |
| SILK PRINTED REGION RSG: | REGION FOR WHICH WHITE LETTERS ARE SILK PRINTED |
| BOARD BASE REGION RSB: | REGION FOR WHICH THE BOARD BASE IS EXPOSED |
| GOLD PLATED REGION RGP: | REGION FOR WHICH GOLD IS PLATED |

G1(RBR), IM
G2(RPR)
GL(RGP)
BR(RSB) WH(RSG)

GR { GREEN AREA G1 — BASE RESIST REGION RBR
     GREEN AREA G2 — PATTERN RESIST REGION RPR

WHITE AREA WH — SILK PRINTED REGION RSG

BROWN AREA BR — BOARD BASE REGION RSB

GOLD AREA GL — GOLD PLATED REGION RGP

✦ : SAMPLE POINT

GREEN AREA GR(G1+G2)  →  RESIST AREA

WHITE AREA WH  →  SILK AREA

BROWN AREA BR  →  BASE AREA

GOLD AREA GL  →  PLATED AREA

○ : REPRESENTATIVE COLOR    ● : INDIVIDUAL COLOR

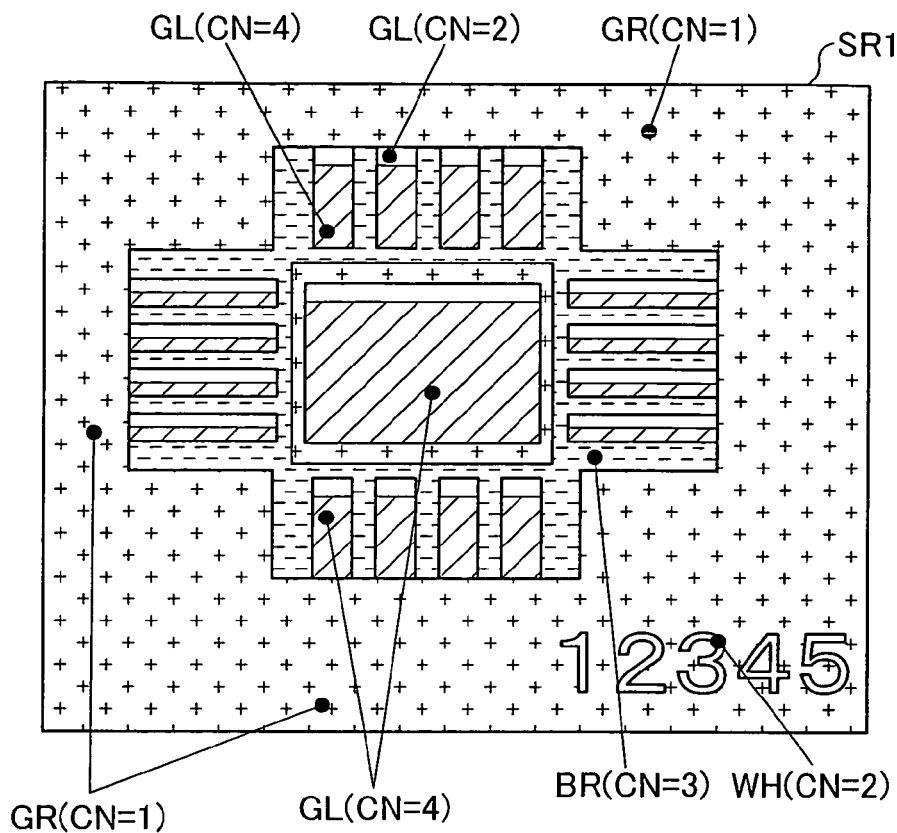
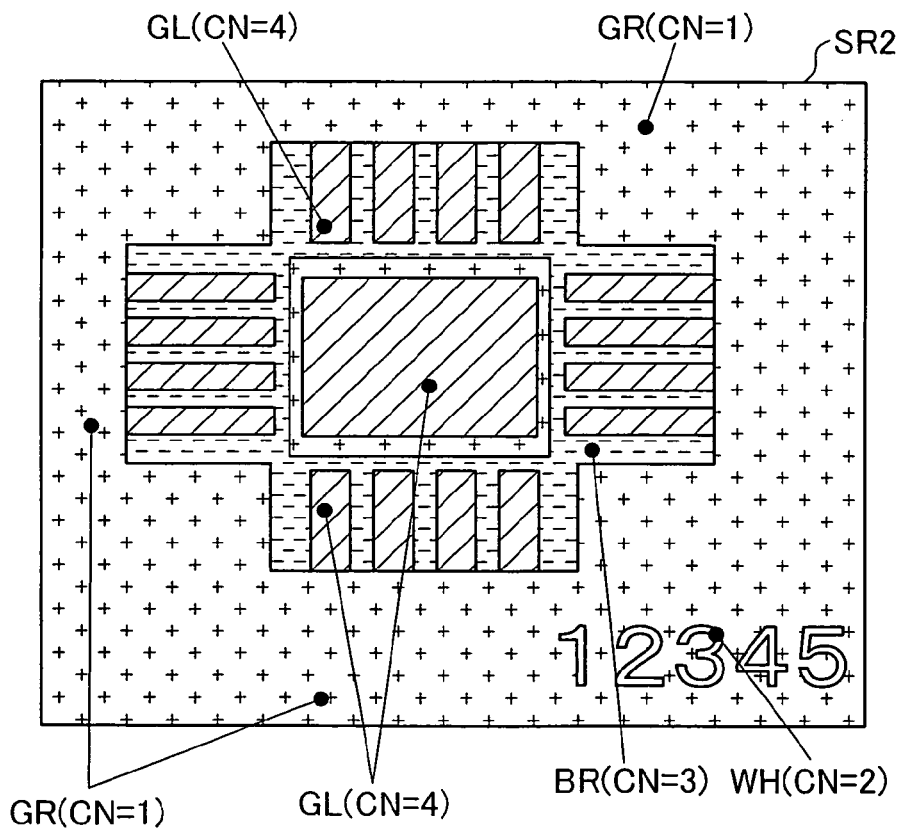

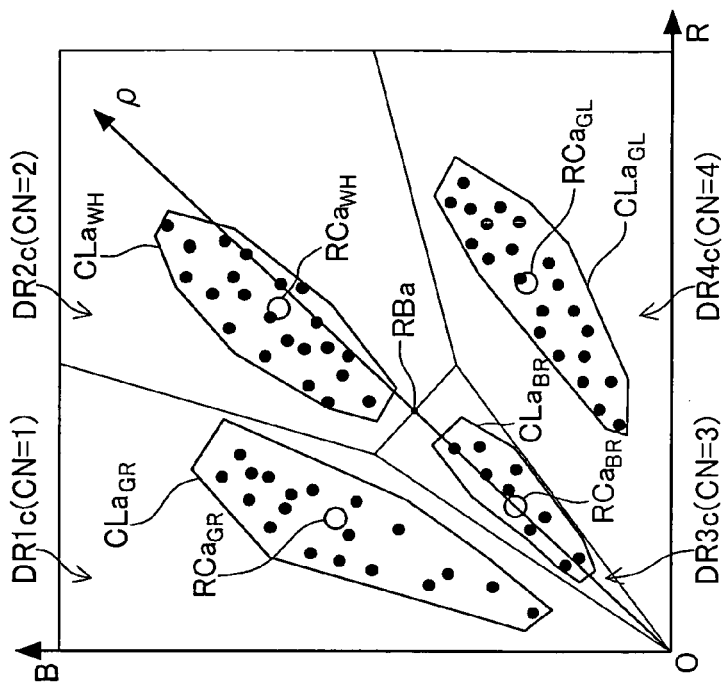
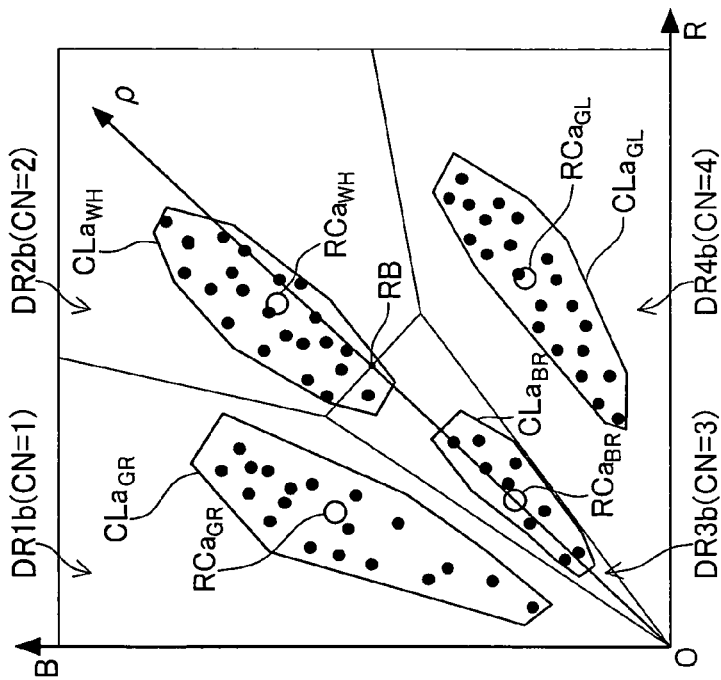
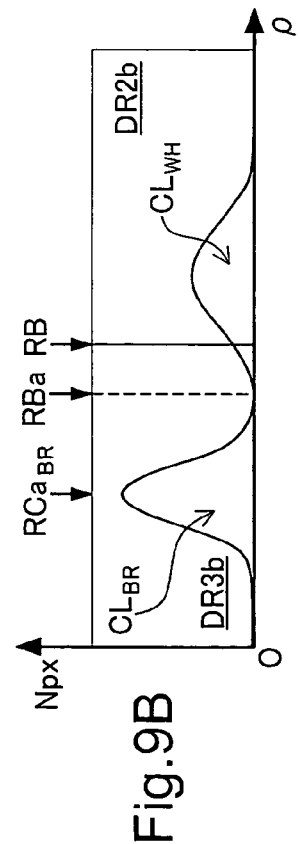
Fig.9C
Fig.9A
Fig.9B

SEGMENTATION TECHNIQUE OF AN IMAGE

CROSS-REFERENCE TO RELATED APPLICATIONS

The present application claims the priority based on Japanese Patent Application No. 2004-212541 filed on Jul. 21, 2004, the disclosure of which is hereby incorporated herein by reference in its entirety.

BACKGROUND OF THE INVENTION

1. Field of the Invention

This invention relates to a technology for area segmentation of an image into image areas corresponding to a plurality of representative colors.

2. Description of the Related Art

As inspection apparatus such as a printed circuit board tester detects a defect in a product subject to testing by comparing the layout of regions on the product which is identified from an image of the product, with layout of regions on a reference product. With some kind of inspection apparatus area segmentation is performed for dividing an image of the product into image areas corresponding to a plurality of predetermined representative colors in order to identifying layout of the regions on the product.

However, with the conventional methods, there is a case that area segmentation is not adequately reliable and area segmentation result is incorrect.

SUMMARY OF THE INVENTION

An object of the present invention is to improve reliability of area segmentation result of an image segmented into image areas corresponding to a plurality of representative colors.

According to an aspect of the present invention, a method for segmentation of an image into a plurality of image areas is provided. The method comprises the steps of: (a) determining a plurality of representative colors; (b) determining a weight associated with each of the plurality of representative colors; (c) calculating weighted color difference index values associated with the plurality of representative colors according to the weights, respectively, with respect to each pixel constituting the image, the weighted color difference representing difference in color between an individual color representing color of each pixel constituting the image and each of the plurality of representative colors; and (d) performing segmentation of the image into the plurality of image areas according to the weighted color difference index values by classifying the individual color into one of a plurality of representative color regions associated with the plurality of representative colors.

According to this arrangement, it is possible to expand a representative color region by setting heavy weight while shrinking another representative color region by setting light weight in a color space. As a result, by means of determining appropriate weights, reliability of area segmentation result may be improved and favorable area segmentation result may be obtained.

The present invention may be realized in various aspects, for example, a method and a apparatus for identifying surface region layout of an object, an inspection method and apparatus employing these identified result; a computer program for realizing the functions of these methods or apparatus; a recording medium on which that computer program is recorded, data signals embodied within carrier waves including that computer program, and the like.

These and other objects, features, aspects, and advantages of the present invention will become more apparent from the following detailed description of the preferred embodiments with the accompanying drawings.

BRIEF DESCRIPTION OF THE DRAWINGS

FIG. 8A and FIG. 8B show the result of segmentation of the color image shown in FIG. 4.

FIG. 9A through 9C illustrate determination of weighting values of representative colors in the second embodiment.

DESCRIPTION OF THE PREFERRED EMBODIMENT

Embodiments of the present invention will now be described in the following sequence.
A. First Embodiment:
B. Second Embodiment:
C. Third Embodiment:
D. Modifications:

A. First Embodiment

Figure 1:
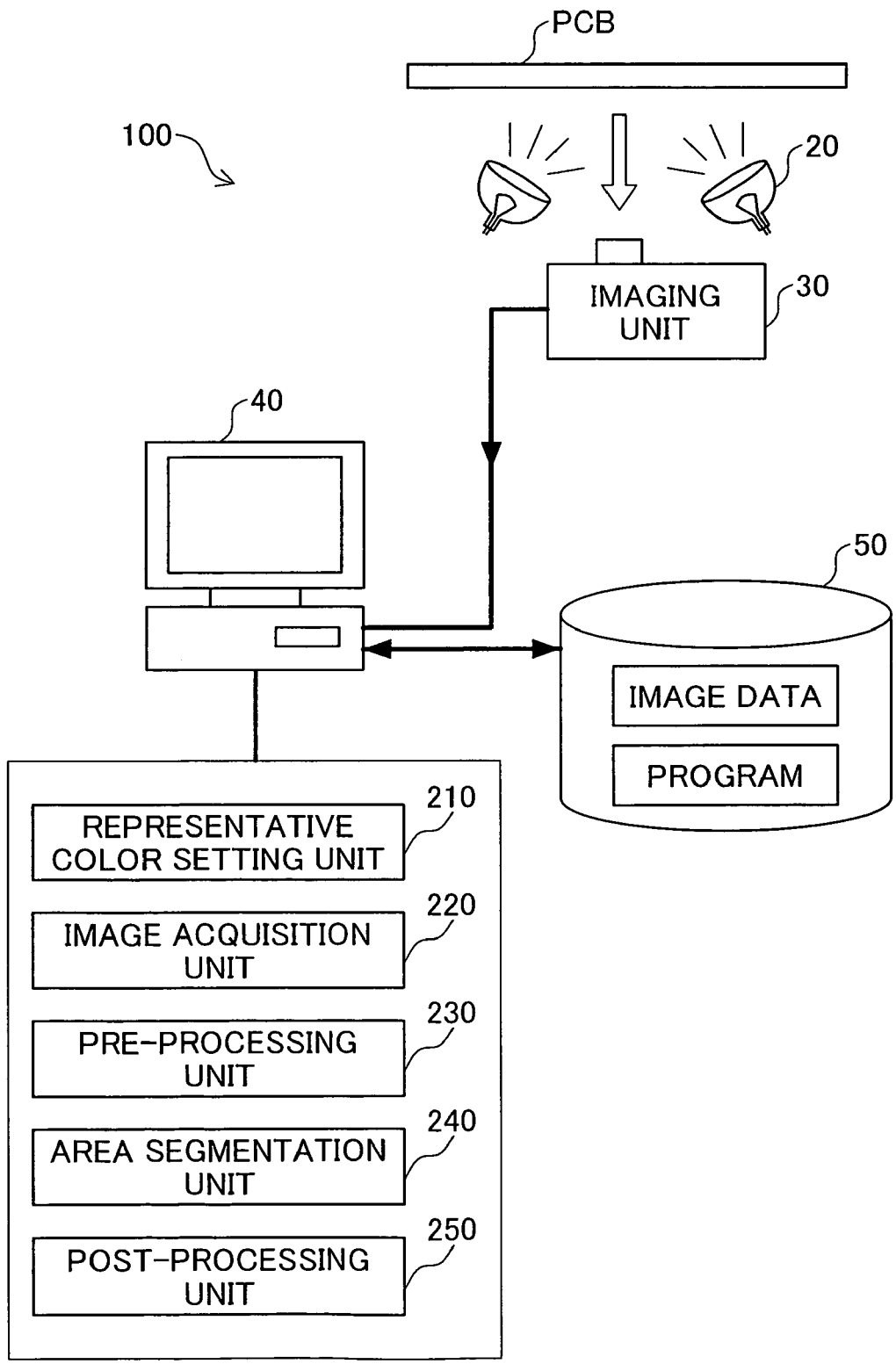
FIG. 1 illustrates the configuration of a printed circuit board tester 100 as an embodiment of the present invention.

FIG. 1 illustrates the configuration of a printed circuit board tester 100 as an embodiment of the present invention. This printed circuit board tester 100 comprises a light source 20 for illuminating a printed circuit board PCB, an imaging unit 30 for capturing an image of the printed circuit board PCB, and a computer 40 for performing control of the device as a whole. The computer 40 is connected to an external storage device 50 for storing various data and computer programs.

The computer has the functions of a representative color setting unit 210, an image acquisition unit 220, a pre-processing unit 230, an area segmentation unit 240, and a post-processing unit 250. The functions of these units are realized through execution of a computer program stored on the external storage device 50 by the computer 40.

Figure 2:
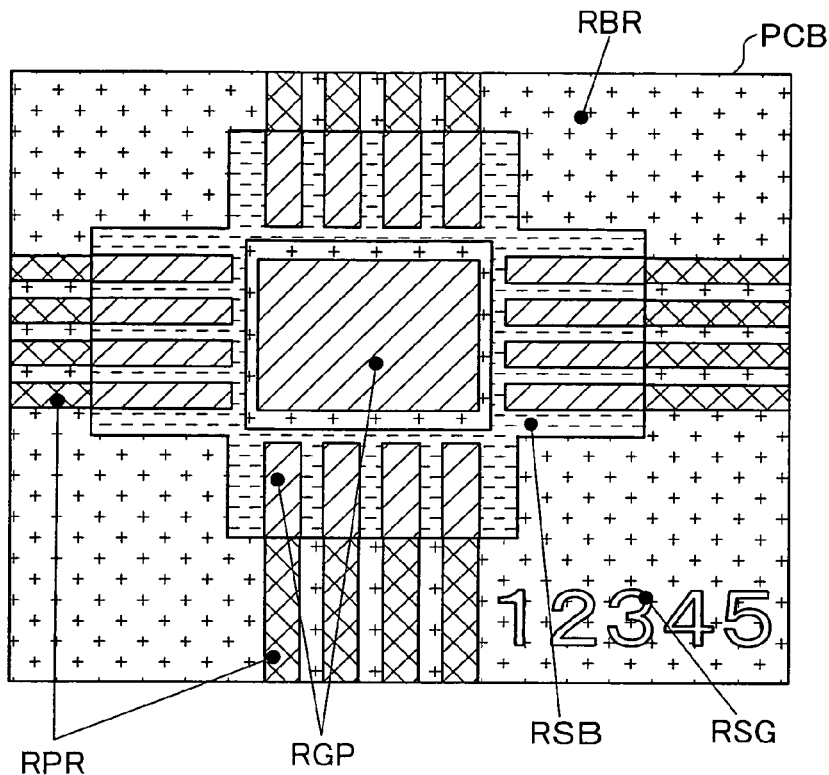
FIG. 2 illustrates the surface of a printed circuit board PCB.

FIG. 2 illustrates the surface of a printed circuit board PCB. The surface of the printed circuit board PCB includes a base resist region RBR for which resist is coated on the board base, pattern resist regions RPR for which resist is coated on copper wiring pattern, a silk printed region RSG for which white letters are silk printed onto the board base, a board base region RSB for which the board base is exposed, and gold plated regions RGP for which gold is plated.

Figure 3:
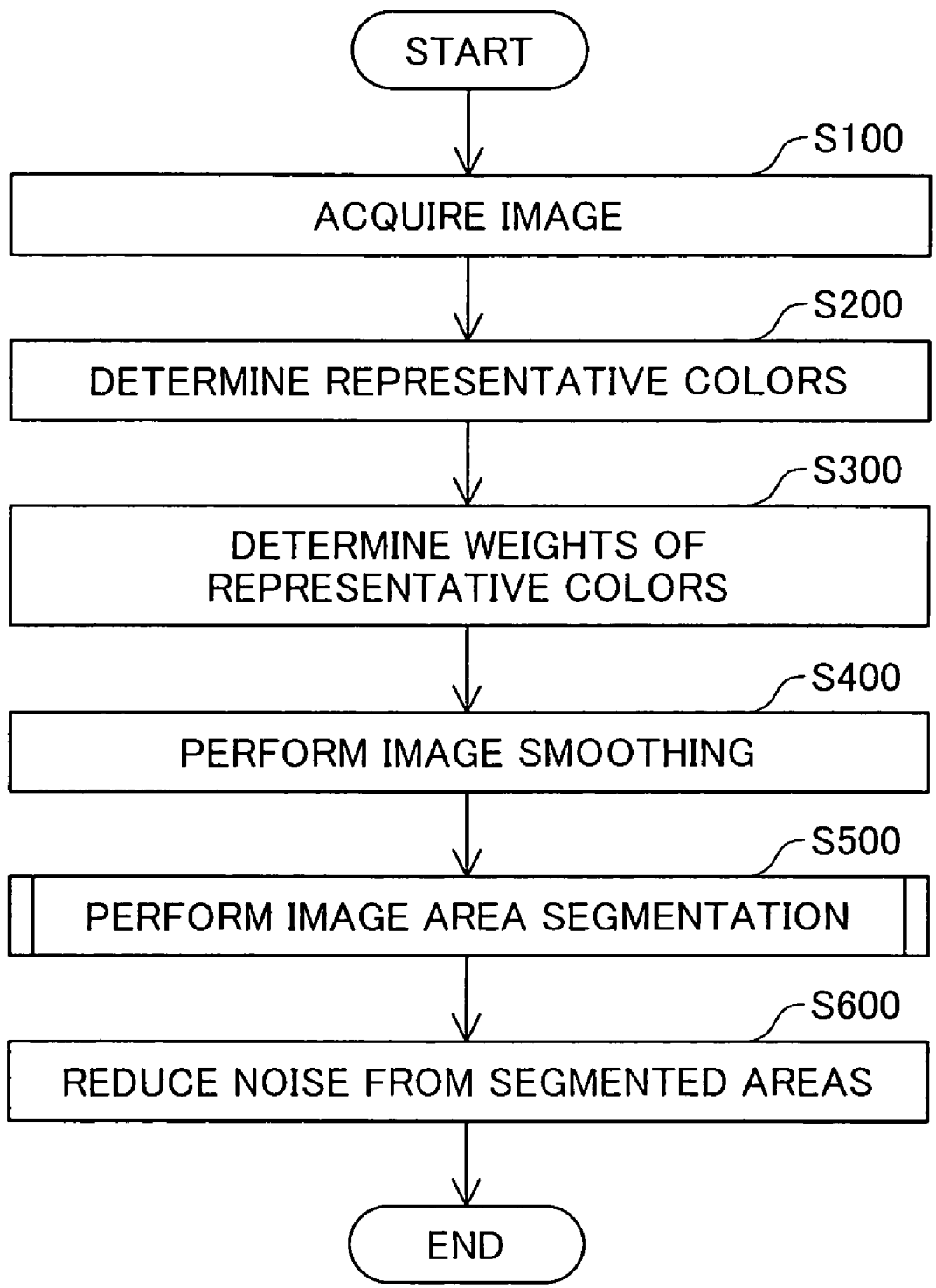
FIG. 3 is a flowchart showing the procedure for generating image areas in the first embodiment.

FIG. 3 is a flowchart showing the procedure for generating image areas in the first embodiment. At Step S100, the image acquisition unit 220 (FIG. 1) acquires a color image of the printed circuit board PCB from the imaging unit 30 (FIG. 1). When executing the procedure from step S200 and thereafter in relation to the image acquired in advance, image data is read from the external storage device 50 (FIG. 1) at step S100.

Figure 4:
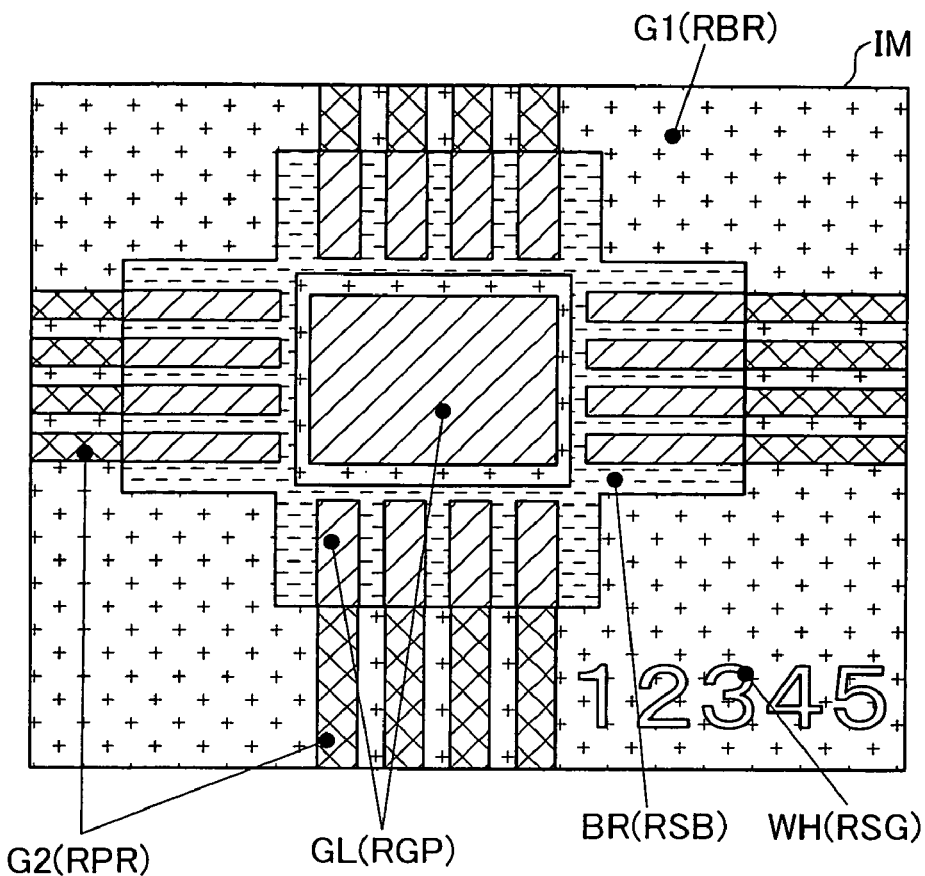
FIG. 4 depicts the color image IM of the printed circuit board PCB acquired at Step S100.

FIG. 4 depicts the color image IM of the printed circuit board PCB (FIG. 2) acquired at Step S100. This color image IM includes two green areas G1 and G2, a white area WH, a brown area BR, and a gold area GL. In this embodiment, the two green areas G1, G2 are collectively called as a "green area GR."

In the color image IM, the base resist region RBR of the printed circuit board PCB is represented by the first green area G1, and the pattern resist regions RPR are represented by the second green area G2. Similarly, the silk printed region RSG, the board base region RSB, and the gold plated regions RGP are represented respectively by the white area WH, brown area BR, and gold area GL.

At Step S200 (FIG. 3), the user specifies a plurality of representative colors by using the mouse or other pointing device, while viewing the color image of the printed circuit board PCB (FIG. 2) displayed on the screen of the computer 40. At this time, the representative color setting unit 210 (FIG. 1) displays on the screen of the computer 40 a predetermined dialog box for the representative color setting process in order to enable the user to specify representative colors.

Figure 5:
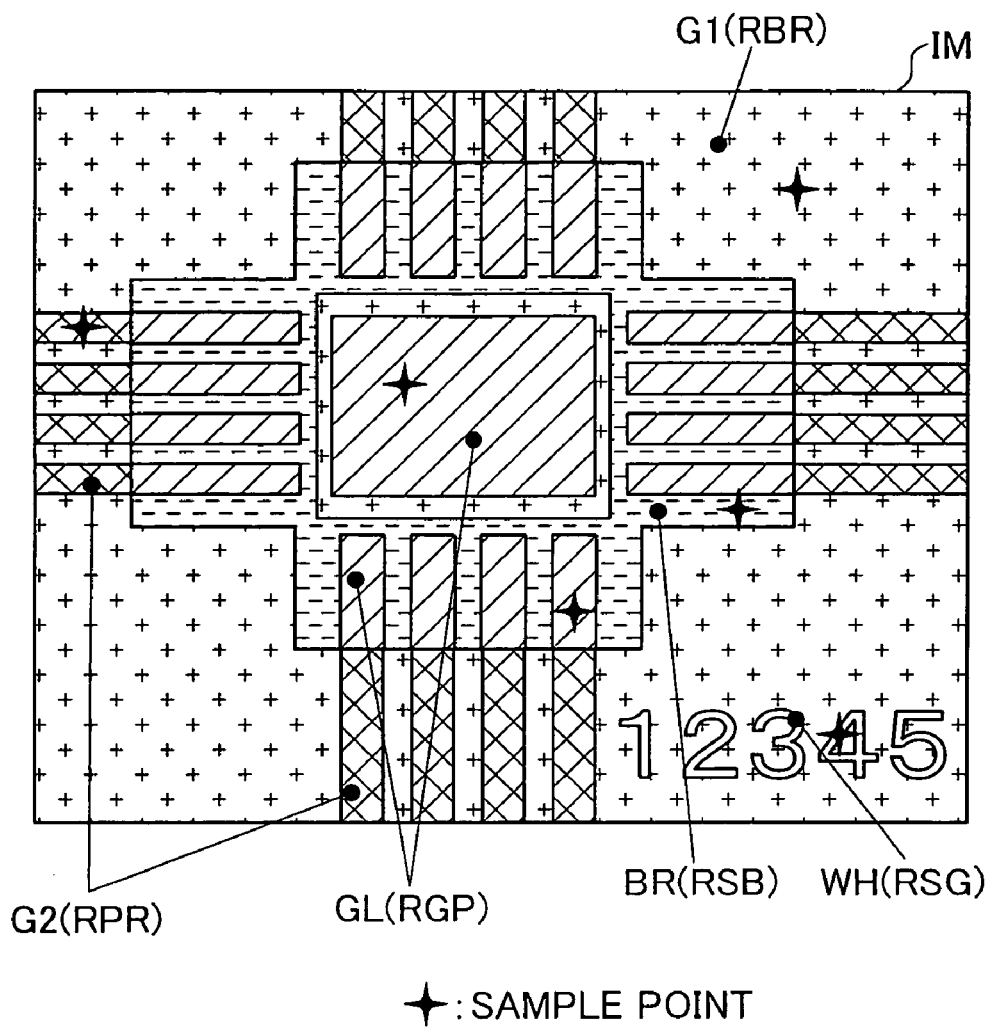
FIG. 5 is an explanatory drawing showing the way of specifying the representative colors.

FIG. 5 is an explanatory drawing showing the way of specifying the representative colors. The user inputs the names of the four areas GR (G1+G2), WH, BR, GL (e.g., "resist area", "silk area" etc.) into the dialog box on the screen, and specifies sample points on the color image IM (indicated by star marks) for determination of representative color for each area. At least one sample point is specified for each area. When several sample points are specified for a single area, an average color of colors at the sample points is used as the representative color for the area. In general, both of the number of areas and the number of representative colors are set to N(where N is an integer equal to 2 or greater).

At step S300 (FIG. 3), the user specifies a weighting value (weight) for each representative color. The representative color setting unit 210 displays a dialog box on the screen of the computer 40, and the user inputs weighting values for the representative colors into the dialog box. The representative color setting unit 210 determines a weighting value Wt(i) for the i-th (i=1~N) representative color in accordance with input by the user. In the case that the user does not specify a weighting value Wt(i) for a representative color, the weighting value Wt(i) is set to an initial value of 1. It is preferable that at least one weighting value Wt(i) is determined at a value different from others.

At step S400, the pre-processing unit 230 (FIG. 1) performs a smoothing process (blurring process) on the color image acquired at step S100. With the smoothing process, it is possible to use various smoothing filters such as a median filter, Gaussian filter, or moving average filter. By performing this smoothing process, it is possible to remove a singular pixel existing within the image data, making it possible to obtain image data with little garbage (noise component). Note that the smoothing process may be omitted.

At step S500, the area segmentation unit 240 (FIG. 1) calculates, for the color of each pixel consisting the color image (hereinafter also called "individual color"), weighted distance index values from the plurality of representative colors (described later). Individual color of each pixel is classified into regions associated with representative colors (representative color regions) according to weighted distance index value. On the basis of the individual color classification result, the area segmentation unit 240 classifies each pixel into a plurality of image areas.

Figure 6:
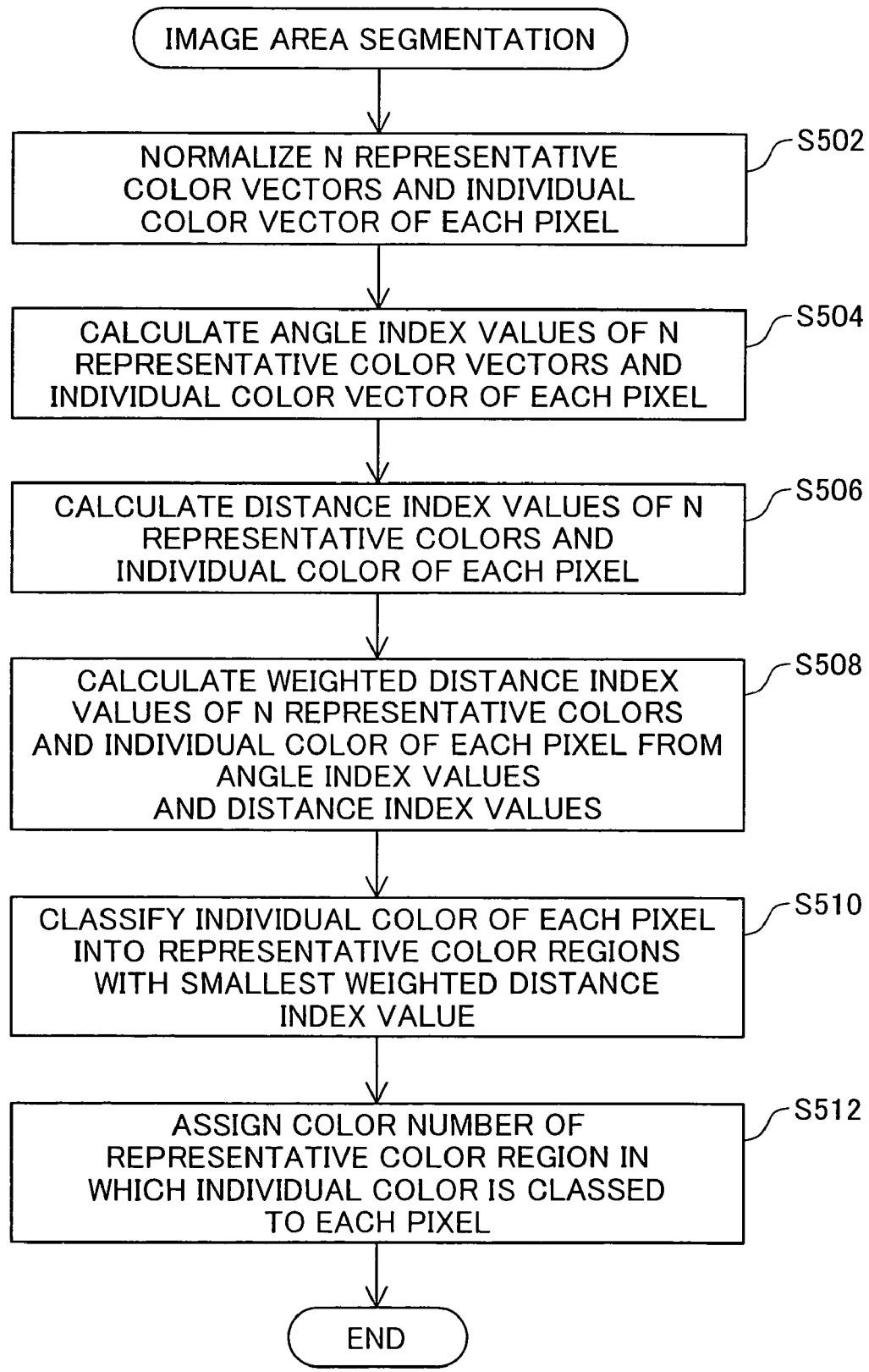
FIG. 6 is a flowchart showing the procedure of the Step S500 in detail.

FIG. 6 is a flowchart showing the procedure of the Step S500 in detail. At step S502, representative color vectors representing the N representative colors and individual color vectors representing individual colors of pixels are normalized. Normalization of representative color vectors is carried out according to following equations (1a) through (1d).

$$L_{Ref}(i) = R_{Ref}(i) + G_{Ref}(i) + B_{Ref}(i). \tag{1a}$$

When $L_{Ref}(i) \neq 0$ $$Rv_{Ref}(i) = R_{Ref}(i)/L_{Ref}(i), \tag{1b}$$

$$Gv_{Ref}(i) = G_{Ref}(i)/L_{Ref}(i), \tag{1c}$$

$$Bv_{Ref}(i) = B_{Ref}(i)/L_{Ref}(i). \tag{1d}$$

When $L_{Ref}(i) = 0$ $$Rv_{Ref}(i) = Gv_{Ref}(i) = Bv_{Ref}(i) = 1/3.$$

Here, $R_{Ref}(i)$ denotes the R (Red) component of the i-th representative color, $G_{Ref}(i)$ denotes the G (Green) component thereof, and $B_{Ref}(i)$ denotes the B (Blue) component thereof. $Rv_{Ref}(i)$, $Gv_{Ref}(i)$ and $Bv_{Ref}(i)$ are the RGB components after normalization. In equation (1a), a value $L_{Ref}(i)$ for normalization is derived by means of the arithmetic summation of the three component values $R_{Ref}(i)$, $G_{Ref}(i)$ and $B_{Ref}(i)$. In equations (1b) through (1c), the components are normalized by the value $L_{Ref}(i)$.

Individual color vectors for pixels are also normalized similarly to representative colors, in accordance with equations (2a) through (2d).

$$L(j) = R(j) + G(j) + B(j). \tag{2a}$$

When $L(i) \neq 0$ $$Rv(j) = R(j)/L(j), \tag{2b}$$

$$Gv(j) = G(j)/L(j), \tag{2c}$$

$$Bv(j) = B(j)/L(j). \tag{2d}$$

When $L(i) = 0$ $$Rv(j) = Gv(j) = Bv(j) = 1/3.$$

Here, j is a number for identifying pixel within the color image.

The N representative color vectors and individual color vectors of pixels may be normalized such that length of vectors does not affect calculation of angle index values of the N representative color vectors and individual color vectors of pixels (described later). For example, normalization of representative color vectors may be carried out in accordance with equations (3a) through (3d) below, and normalization of individual color vectors could be carried out in accordance with equations (4a) through (4d) below.

$$L_{Ref}(i) = \sqrt{R_{Ref}(i)^2 + G_{Ref}(i)^2 + B_{Ref}(i)^2}. \quad (3a)$$

When $L_{Ref}(i) \neq 0$ $$Rv_{Ref}(i) = R_{Ref}(i)/L_{Ref}(i), \quad (3b)$$

$$Gv_{Ref}(i) = G_{Ref}(i)/L_{Ref}(i), \quad (3c)$$

$$Bv_{Ref}(i) = B_{Ref}(i)/L_{Ref}(i). \quad (3d)$$

When $L_{Ref}(i) = 0$ $$Rv_{Ref}(i) = Gv_{Ref}(i) = Bv_{Ref}(i) = 1/\sqrt{3}.$$

$$L(j) = \sqrt{R(j)^2 + G(j)^2 + B(j)^2}. \quad (4a)$$

When $L(i) \neq 0$ $$Rv(j) = R(j)/L(j), \quad (4b)$$

$$Gv(j) = G(j)/L(j), \quad (4c)$$

$$Bv(j) = B(j)/L(j). \quad (4d)$$

When $L(i) = 0$ $$Rv(j) = Gv(j) = Bv(j) = 1/\sqrt{3}.$$

By carrying out normalization using these equations (3a) through (3d) and equations (4a) through (4d), both of representative color vector length and individual color vector length becomes 1.

At step S504 of FIG. 6, angle index values $V(i,j)$ of the N representative color vectors and individual color vectors of pixels are calculated in accordance with equation (5a) or equation (5b) below.

$$V(i,j) = \{|Rv_{Ref}(i) - Rv(j)| + |Gv_{Ref}(i) - Gv(j)| + |Bv_{Ref}(i) - Bv(j)|\} \times k1, \quad (5a)$$

$$V(i,j) = [\{Rv_{Ref}(i) - Rv(j)\}^2 + \{Gv_{Ref}(i) - Gv(j)\}^2 + \{Bv_{Ref}(i) - Bv(j)\}^2] \times k1. \quad (5b)$$

The first term in brackets on the right side of equation (5a) represents the absolute value of the difference between the normalized R component value $Rv_{Ref}(i)$ of the i-th representative color and the normalized R component value $Rv(j)$ of the j-th pixel individual color. The second and third terms represent corresponding values for the G component and B component. k1 is a predetermined non-zero coefficient. Equation (5b) employs the square of the difference, rather than the absolute value of the difference.

Generally, the value $V(i,j)$ calculated with equation (5a) or equation (5b) is a value representing normalized angular difference between representative color and normalized individual color. A smaller value $V(i,j)$ indicates a smaller angle between a representative color vector and an individual color vector. Thus, in this embodiment, the value $V(i,j)$ calculated with equation (5a) or equation (5b) is used as an angle index value substantially representing the angle between a representative color vector and an individual color vector.

Where the coefficient k1 is 1, the angle index value $V(i,j)$ is in the range 0~2. This angle index value $V(i,j)$ is calculated for all combinations of N representative color vectors and pixel individual color vectors.

At step S506, a distance index value $D(i,j)$ is calculated for the N representative color vectors and pixel individual color vectors, in accordance with equation (6a) or equation (6b) below.

$$D(i,j) = \frac{|R_{Ref}(i) - R(j)| + |G_{Ref}(i) - G(j)| + |B_{Ref}(i) - B(j)|}{k2} \quad (6a)$$

$$D(i,j) = \frac{\sqrt{\{R_{Ref}(i) - R(j)\}^2 + \{G_{Ref}(i) - G(j)\}^2 + \{B_{Ref}(i) - B(j)\}^2}}{k2} \quad (6b)$$

The first term in brackets on the right side of equation (6a) represents the absolute value of the difference between the unnormalized R component value $R_{Ref}(i)$ of the i-th representative color and the unnormalized R component value $R(j)$ of the j-th pixel individual color. The second and third terms represent corresponding values for the G component and B component. k2 is a predetermined non-zero coefficient. Equation (6b) employs the square root of the summation of squares of the difference, rather than the absolute value of the difference. In equation (6a) and (6b), in contrast to equations (5a) and (5b), unnormalized values $R_{Ref}(i)$ and $R(j)$ are used. Accordingly, the right side of equation (6a) and (6b) gives a value associated with unnormalized distance between representative color and individual color. Thus, in this embodiment, the value $D(i,j)$ calculated with equation (6a) or equation (6b) is used as a distance index value substantially representing the distance between a representative color and an individual color.

Where the coefficient k2 is 1, the distance index value $D(i,j)$ given by equation (6a) is in the range 0~765. This distance index value $D(i,j)$ is also calculated for all combinations of N representative color vectors and pixel individual color vectors as the angle index value $V(i,j)$.

At step S508, a weighted distance index value $C(i,j)$ is calculated for the i-th representative color and the j-th pixel individual color, in accordance with equation (7a) or equation (7b) below.

$$C(i,j) = \{V(i,j) + D(i,j)\} \times W(i) \quad (7a)$$

$$C(i,j) = V(i,j) \times D(i,j) \times W(i) \quad (7b)$$

In equation (7a), the summation of the angle index value $V(i,j)$ and the distance index value $D(i,j)$ inside the brackets, multiplied by the distance weighting value $W(i)$ associated with the i-th representative color, is employed as the weighted distance index value $C(i,j)$. In equation 7(b), the product of the angle index value $V(i,j)$, the distance index value $D(i,j)$, and the distance weighting value $W(i)$ is employed as the weighted distance index value $C(i,j)$.

As will be understood from equations (7a) and (7b), the weighted distance index value $C(i,j)$ given by equation (7a) or (7b) assumes a smaller value with a smaller angle between the i-th representative color vector and the j-th pixel individual color, and with shorter distance between a representative color and an individual color in the color space. Also, the weighted distance index value $C(i,j)$ given by equation (7a) or (7b) assumes a smaller value with a smaller distance weighting value $W(i)$ associated with the i-th representative color.

In the first embodiment, the inverse of the representative color weighting value $Wt(i)$, i.e. $(1/Wt(i))$, is used as the distance weighting value $W(i)$. This is because the representative color region associated with the i-th representative color (described later) shrinks as the increase of the distance weighting value $W(i)$.

After the calculation of the weighted distance index values C(i,j) relating to the plurality of representative colors for color of each pixel, individual color of each pixel is classified into representative color regions that minimize the weighted distance index values C(i,j) at step S510. Here, "representative color region" refers to the range of color associated with one representative color. Since N weighted distance index value C(i,j) associated with the N representative colors are derived for each pixel, individual color of the pixel is classified into one of the representative color regions giving the smallest value among these weighted distance index values C(i,j).

After the assignment of the individual color of each pixel to one of the representative color regions, the area segmentation unit 240 divides the color image into a plurality of image areas according to the representative color regions to which the individual colors of pixels belong at step S512 of FIG. 6. For example, the color image is divided by assigning to pixels whose individual colors belong to representative color regions unique numbers (color numbers CN) different from those of other representative color regions. Specifically, to each pixel of the color image is assigned a color number CN corresponding to the representative color region in which the individual color of the pixel is classified.

Figure 7A:
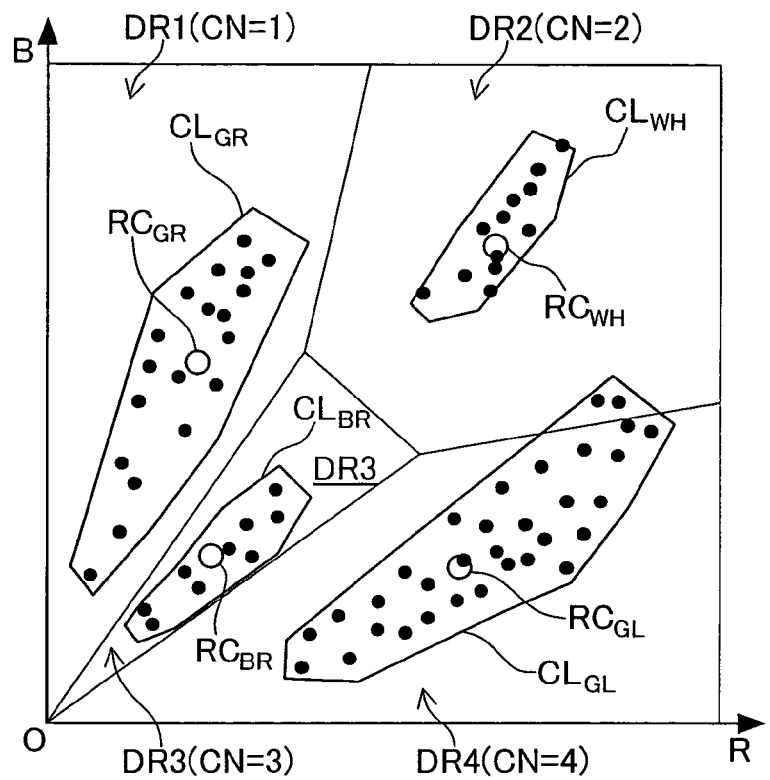
FIG. 7A and FIG. 7B illustrate classification of individual colors of pixels into representative color regions that minimize weighted distance index value $C(i,j)$.
Figure 7B:
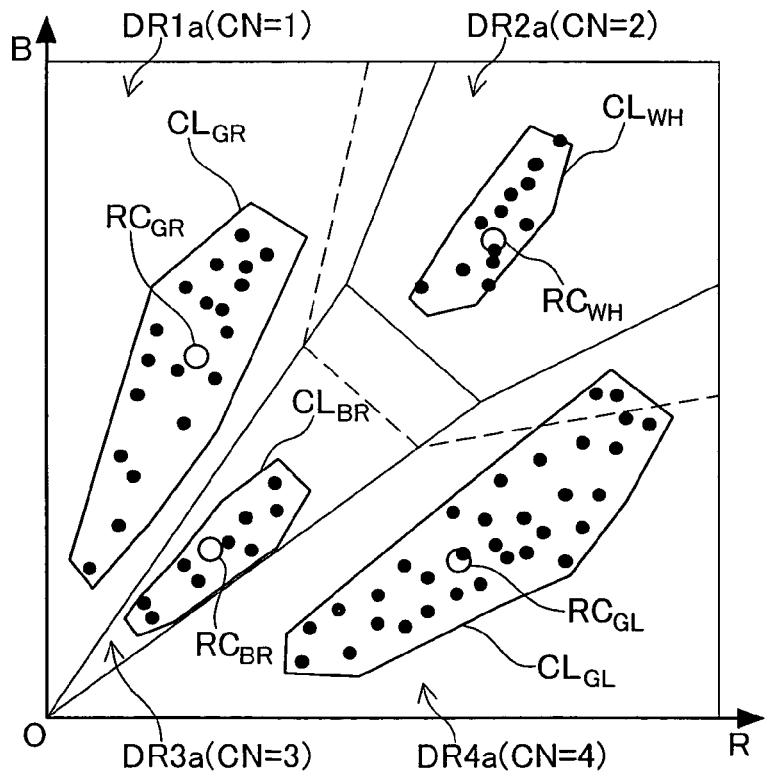

FIG. 7A and FIG. 7B illustrate classification of individual colors of pixels into representative color regions that minimize weighted distance index value C(i,j). As described with FIG. 5, at step S200 (FIG. 3), the four representative colors $RC_{CR}$, $RC_{WH}$, $RC_{BR}$, $RC_{GL}$ are determined that correspond to four types of color area, namely, the green area GR, the white area WH, the brown area BR, and the gold area GL. Accordingly, in FIG. 7, individual colors of pixels are classified into representative color regions DR1~DR4 corresponding to these four representative colors. In FIG. 7, for the sake of convenience in illustration, there are depicted points that represent representative colors in a two-dimensional color space composed of two color components, i.e. the R component and the B component.

As shown in FIG. 7A, individual colors of pixels form color regions with similar colors (clusters) $CL_{GR}$, $CL_{WH}$, $CL_{BR}$, $CL_{GL}$ at the perimeters of the four representative colors $RC_{GR}$, $RC_{WH}$, $RC_{BR}$, $RC_{GL}$. The green cluster $CL_{GR}$ is formed by the individual colors of pixels within the green area GR shown in FIG. 4. Similarly, the cluster $CL_{WH}$ is formed by the individual colors of pixels within the white area WH, the cluster $CL_{BR}$ by the individual colors of pixels within the brown area BR, and the cluster $CL_{GL}$ by the individual colors of pixels within the gold area GL, respectively. That is, where it is possible to classify pixels into clusters including individual colors, favorable area segmentation result of a color image IM can be achieved.

FIG. 7A depicts representative color regions DR1~DR4 when the weighting values $Wt_{GR}$, $Wt_{WH}$, $Wt_{BR}$, $Wt_{GL}$ of the four representative colors $RC_{GR}$, $RC_{WH}$, $RC_{BR}$, $RC_{GL}$ are all set to 1. As shown in FIG. 7A, the green cluster $CL_{GR}$ is included in representative color region DR1. Similarly, the white cluster $CL_{WH}$ is included in representative color region DR2, and the brown cluster $CL_{BR}$ in representative color region DR3. Thus, the areas GR, WH, BR whose individual colors are included in these three clusters $CL_{GR}$, $CL_{WH}$, $CL_{BR}$ are classified into discrete image areas assigned different color numbers CN. The gold cluster $CL_{GL}$, on the other hand, straddles two representative color regions DR2, DR4. Thus, the gold area GL whose individual color is included in the gold cluster $CL_{GL}$, despite being a single area originally, is divided into two image areas of color number CN=2 and color number CN=4.

FIG. 7B depicts representative color regions DR1a~DR4a when the weighting values $Wt_{GR}$, $Wt_{BR}$, $Wt_{GL}$ of three representative colors $RC_{GR}$, $RC_{BR}$, $RC_{GL}$ are set to 1, and the weighting value $Wt_{WH}$ of representative color $RC_{WH}$ is set to ½. When the weighting value of a certain representative color decreases as in the above manner, the representative color region for the representative color shrinks. In the example of FIG. 7B, since the weighting value $Wt_{WH}$ of representative color $RC_{WH}$ is ½, the representative color region DR2a is smaller than the representative color region DR2 represented by the broken line, and the gold cluster $CL_{GL}$ belongs to a single representative color region DR4a. Thus, the gold area GL whose individual color is included in the gold cluster $CL_{GL}$ constitutes a single image area, similar to the other areas GR, WH, BR.

FIG. 8A and FIG. 8B show the result of segmentation of the color image shown in FIG. 4. FIG. 8A depicts the segmentation result SR1 when the weighting values $Wt_{GR}$, $Wt_{WH}$, $Wt_{BR}$, $Wt_{GL}$ are all set to 1. FIG. 8B depicts the segmentation result SR2 when the weighting values $Wt_{GR}$, $Wt_{BR}$, $Wt_{GL}$ are set to 1, and the weighting value $Wt_{WH}$ is set to ½.

As shown in FIG. 8A, in the case that weighting values $Wt_{GR}$, $Wt_{WH}$, $Wt_{BR}$, $Wt_{GL}$ are all set to 1, the areas GR, WH, BR are divided into image areas of different color numbers CN. On the other hand, the color number CN of the high-lightness part of the gold area GL is set to a color number of CN=2 corresponding to the representative color region DR2 same as the white area WH. The color number CN of the low-lightness part of the gold area GL is set to a color number of CN=4 corresponding to the representative color region DR4. In this way, the cluster straddles two representative colors, and the single gold area GL is divided over two different image areas. In contrast to this, where the weighting values $Wt_{GR}$, $Wt_{BR}$, $Wt_{GL}$ are set to 1 and the weighting value $Wt_{WH}$ is set to ½ as shown in FIG. 8B, each of the four areas GR, WH, BR, GL is divided properly into image areas of different color numbers CN=1~4.

At step S600 of FIG. 3, the post-processing unit 250 (FIG. 1) performs expansion processing and contraction processing of image areas divided in this manner. By performing this expansion and contraction processing, pinhole shaped small areas (noise) existing in segmented image areas is reduced.

The result of segmentation for which the noise is reduced is supplied to the testing unit (not illustrated) of the printed circuit board tester 100. A reference image captured by imaging a defect-free printed circuit board PCB, and a subject image captured by imaging the printed circuit board PCB subject to testing are input to the testing unit. The testing unit detects a predetermined difference between the two images as a defect of the printed circuit board PCB subject to testing. Alternatively, of the segmented image areas, a specified by the user (e.g. gold plated regions) may be exclusively targeted for inspection, or conversely all areas other than that specified by the user may be targeted for inspection.

The testing unit may also detect a defect of the printed circuit board PCB subject to testing by comparing a reference region layout which represents layout of each region on the defect-free printed circuit board, and a subject region layout identified by the above mentioned segmentation of the subject image. In this case the reference region layout may be identified by capturing a reference image which is an image of defect-free printed circuit board and performing the above mentioned segmentation of the reference image.

In this way, according to the first embodiment, by means of setting weighting values associated with N representative colors, clusters and representative color regions can be associated with one another on a one-to-one basis, so the reliability of area segmentation of color images can be improved.

In the first embodiment, weighting values of representative colors are settable through user instruction. It is also acceptable if the determination of weighting values associated with the N representative colors is possible. For example, weighting values for the N representative colors may be predetermined. In this case, the predetermined weighting values may be stored on the external storage device 50 (FIG. 1) in a storage device incorporated in the computer 40 (FIG. 1).

In the first embodiment, when a plurality of sample points are specified in a single color area the average color of the sample points is used for the representative color of the color area. It is also possible to use all colors of individual sample points for representative colors.

B. Second Embodiment

FIG. 9A through 9C illustrate determination of weighting values of representative colors in the second embodiment. In the second embodiment, weighting values of representative colors are determined on the basis of the result of color image analysis. The second embodiment thus differs from the first embodiment in which weighting values are determined through user instruction. Also, individual color distribution and representative colors of the color image segmentation differ somewhat from the first embodiment. Other respects are the same as the first embodiment.

FIG. 9A depicts representative color regions DR1$b$~DR4$b$ when the weighting values $Wt_{GR}$, $Wt_{WH}$, $Wt_{BR}$, $Wt_{GL}$ of four representative colors $RC_{GR}$, $RC_{WH}$, $RC_{BR}$, and $RC_{GL}$ are set to the initial value of 1. In the second embodiment, as shown in FIG. 9A, the green cluster $CLa_{GR}$ is included within representative color region DR1$b$. Similarly, the brown cluster $CLa_{BR}$ is included within representative color region DR3$b$, and the gold cluster $CLa_{GL}$ within representative color region DR4$b$. Thus, the areas GR, BR, GL in which the individual colors are included in these three clusters $CLa_{GR}$, $CLa_{BR}$, $CLa_{GL}$ are segmented into discrete image areas assigned different color numbers CN. The white cluster $CLa_{WH}$, on the other hand, straddles two representative color regions DR2$b$, DR3$b$. Thus, the white area WH whose individual color is included in the white cluster $CLa_{WH}$, despite originally constituting a single area, is divided into two image areas.

FIG. 9B is a histogram having as its horizontal axis the ρ axis shown in FIG. 9A that passes through the origin 0 and representative color $RCa_{BR}$, and as its vertical axis the number of pixels having individual color on the ρ axis. As noted, the white cluster $CLa_{WH}$ straddles two representative color regions DR2$b$, DR3$b$. Thus, the representative color region DR3$b$ portion of the histogram of FIG. 9B exhibits a first peak, produced by the brown cluster $CLa_{BR}$, at the location of representative color $RCa_{BR}$, and a second peak, produced by the white cluster $CLa_{WH}$, at the location of boundary point RB. Here, the boundary point RB represents the intersection of the boundary of the two representative color regions DR2$b$, DR3$b$ with the ρ axis.

In the case that a representative color region portion of a histogram has two peaks, as with the representative color region DR3$b$, the representative color setting unit 210 (FIG. 1) reduces the weighting value of the corresponding representative color. In the example shown in FIG. 9A and FIG. 9B, the weighting value $Wt_{BR}$ corresponding to representative color $RCa_{BR}$ of the representative color region DR3$b$ is reduced. The reduced weighting value is calculated, for example, by multiplying a predetermined coefficient α (0<α<1) by the weighting value. Then, as shown in FIG. 9B, the boundary point representing the intersection of the boundary of the two representative color regions DR2$c$, DR3$c$ with the ρ axis is moved to point RBa, repeatedly reducing the weighting value $Wt_{BR}$ until the portion of representative color region DR3$c$ denoted by the broken line has a single peak.

FIG. 9C depicts representative color regions DR1$c$~DR4$c$ after the weighting value $Wt_{BR}$ reduction process by the representative color setting unit 210. As noted, the weighting value $Wt_{BR}$ of representative color $RCa_{BR}$ is smaller than the initial value of 1. Thus, the representative color region DR3$c$ corresponding to representative color $RCa_{BR}$ is smaller than the representative color region DR3$b$ shown in FIG. 9A. The white cluster $CLa_{WH}$ is included within a single representative color region DR2$c$. Thus, segmentation is performed such that the white area WH whose individual color is included in the white cluster $CLa_{WH}$ falls in a single image area, similar to the other areas GR, BR, GL, In this way, in the second embodiment as well, clusters and representative color regions can be associated with one another on a one-to-one basis, so the reliability of color image segmentation can be improved.

In the second embodiment, histogram analysis is carried out for ρ p axis that passes through the origin 0 and representative color $RCa_{BR}$. It is also possible to carry out histogram analysis for any line within the color space that passes through a plurality of representative color regions. As such an arbitrary line it is possible to use, for example, a straight line passing through any two representative colors. By performing histogram analysis for a plurality of these lines, weighting values can be determined individually for N representative colors.

In the second embodiment, the weighting value is determined by repeatedly reducing the weighting value $Wt_{BR}$. Some other method is also available for determination of the weighting value. For example, it is possible to set the weighting value, which is obtained by calculation of a weighting value such that the minimum point of the histogram is the boundary point RBa, as the weighting value $Wt_{BR}$ of the representative color $RCa_{BR}$.

C. Third Embodiment

Figure 10:
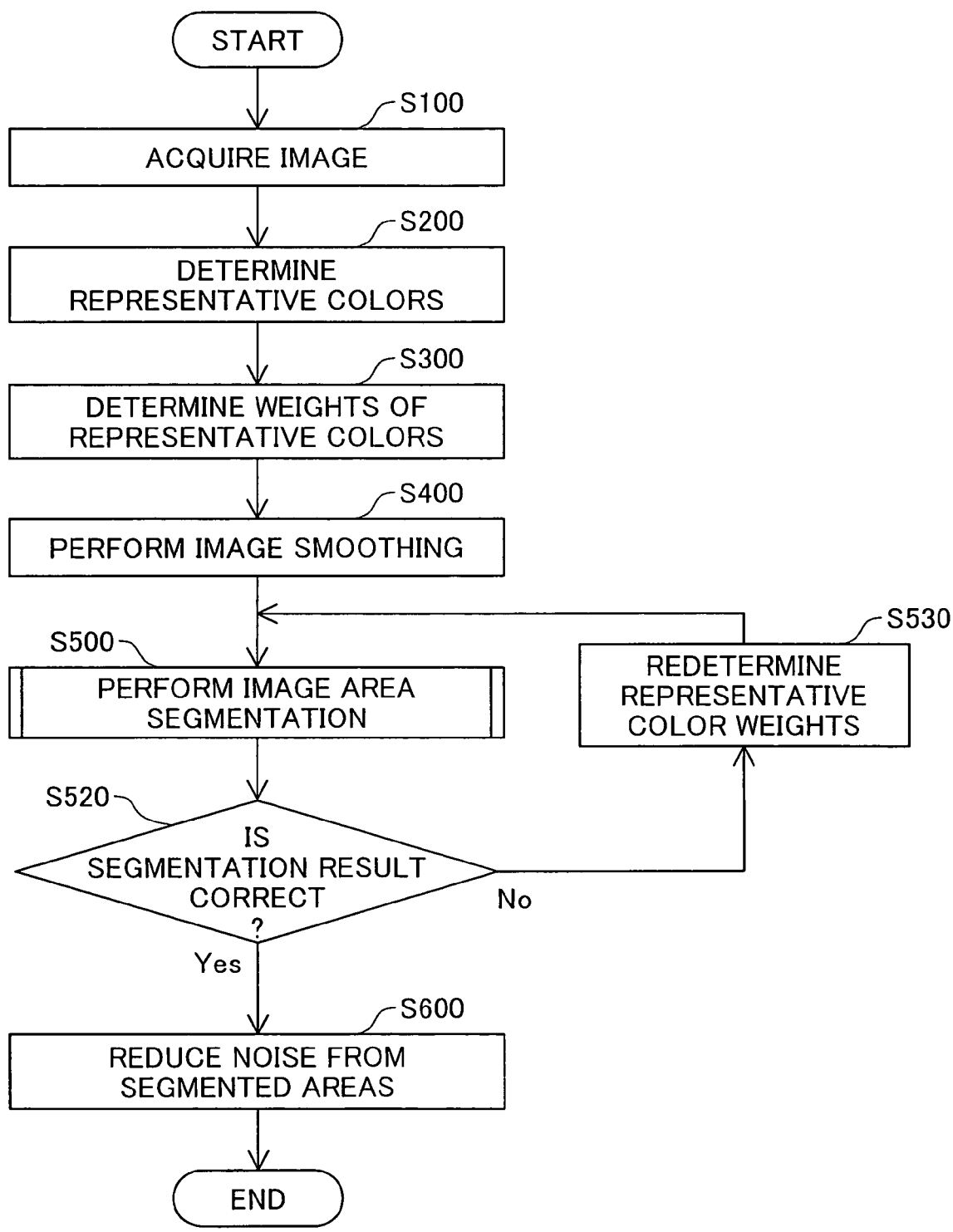
FIG. 10 is a flowchart showing the procedure for generating image areas in the third embodiment.

FIG. 10 is a flowchart showing the procedure for generating image areas in the third embodiment. It differs from the flowchart of the first embodiment in that Step S520 and Step S530 are added. In other respects it is the same as the first embodiment.

At step S520, a determination is made as to whether the result of segmentation executed at step S500 is correct. Specifically, the area segmentation unit 240 displays the segmentation result on the screen of the computer 40, and prompts the user to input whether there is any incorrect segmented area. If the user inputs that there is no incorrect segmented area, a determination is made that the segmentation result is correct, and the process moves to Step S600. On the other hand, if the user inputs that there is incorrect segmented area, a determination is made that the segmentation result is not correct, and the process moves to Step S530.

At step S530, while viewing the color image of the segmentation result being displayed on the screen of the computer 40, the user specifies a point on an image area that is incorrectly segmented by using the mouse or other pointing device. From the point specified by the user, the area segmentation unit 240 identifies a representative point whose weighting value is to be reduced, and reduces the weighting value of that representative point. After reducing the weighting value, the process returns to Step S500.

Figure 11:
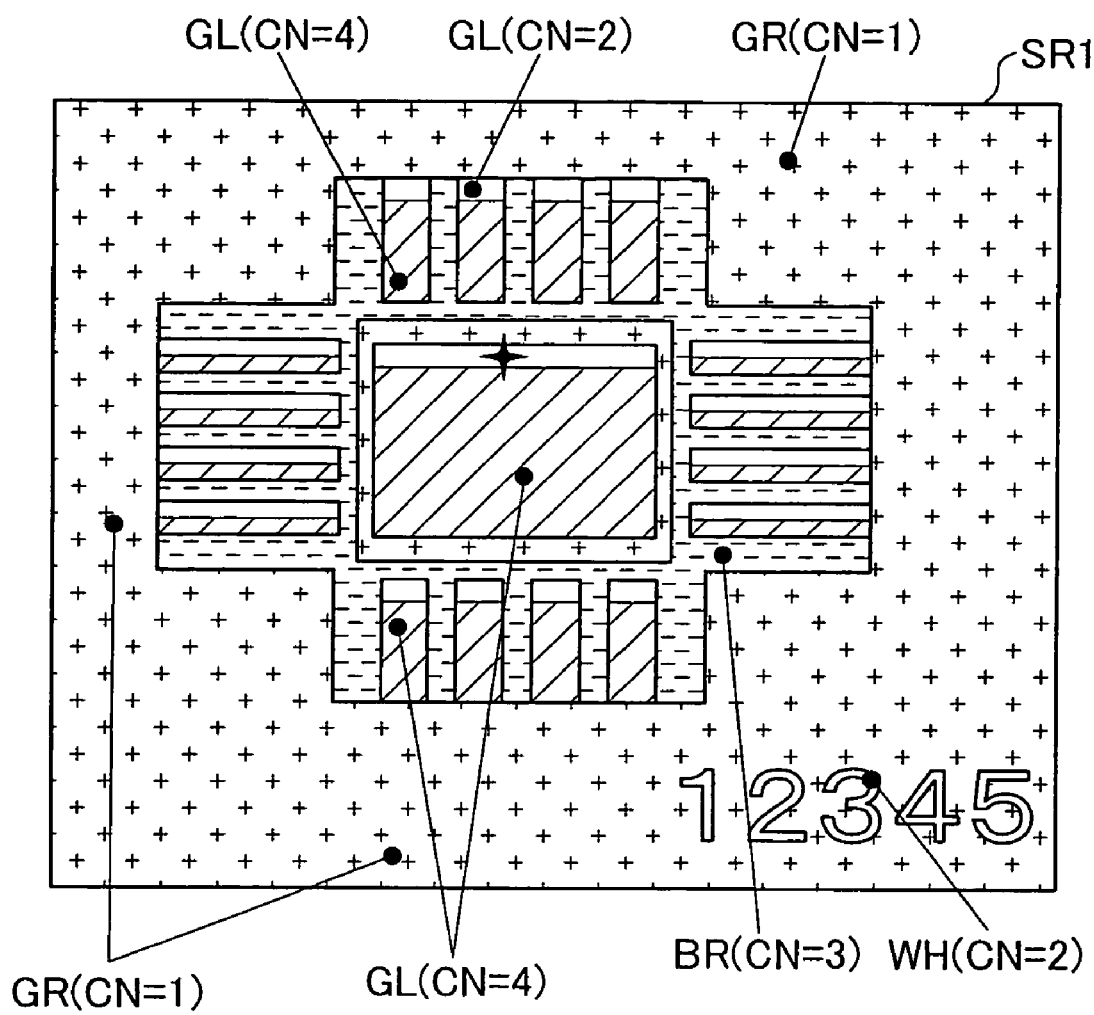
FIG. 11 illustrates the way of specifying an incorrect segmented point.

FIG. 11 illustrates the way of specifying an incorrect segmented point. The user specifies an incorrectly segmented point (indicated by a star mark) on a segmentation result SR1. In the example of FIG. 11, there is specified a point, despite being part of the gold area GL, classified to the image area of color number CN=2. The area segmentation unit 240 determines that the representative color RCWH corresponding to this color number CN=2 is a representative color whose weighting value should be reduced, and reduces the weighting value $Wt_{WH}$ by multiplying a predetermined coefficient α (0<α<1) by the weighting value $Wt_{WH}$ of the representative color $RC_{WH}$. Reduction of the weighting value is carried out until the area segmentation result is determined to be correct. By carrying out area segmentation using the weighting value $Wt_{WH}$ reduced in this manner, a segmentation result such that each of the four areas GR, WH, BR, GL is an image area having a different color number CN=1~4 as with the segmentation result SR2 depicted in FIG. 8B is obtained.

In this way, in the third embodiment as well, clusters and representative color regions can be associated on a one-to-one basis, so the reliability of color image segmentation can be improved.

In the third embodiment, the determination as to whether a segmentation result is correct is made according to the instruction by the user. Some other method is also available for this determination. In this case, for example, the user is able to specify on a color image in advance a location at which incorrect segmentation may occur, and the color number assigned to a pixel at the location when the incorrect segmentation occurs. Then, in the case that the color number assigned to the pixel after segmentation is the specified color number, it is determined that the segmentation result is incorrect. Meanwhile, if the assigned color number and the specified color number are different, it is determined that the segmentation result is correct.

D. Modifications

The invention is not limited to the embodiments and embodiments set forth hereinabove, and may be reduced to practice in various modes without departing from the spirit thereof, such as in the following variations for example.

D1. Modification 1:

With each of the embodiment hereinabove, the weighting value of a representative color, which is corresponding to a representative color region to be shrunk, is reduced in order to improve the reliability of segmentation. It is also possible to make a cluster straddling a plurality of regions be contained within a single representative color region by increasing the weighting value of a representative color appropriately. In this way as well, clusters and representative color regions can be associated on a one-to-one basis, so the reliability of color image segmentation can be improved.

D2. Modification 2:

Determination of weighting values for representative colors may be accomplished by various methods other than the methods taught in the embodiments hereinabove. For example, it is also possible to determine weighting values according to a parameter being an index value relating to a representative color such as lightness and saturation. When weighting values are determined according to lightness as the parameter, a smaller weighting value may be set for representative colors with low lightness for which change of hue due to noise of RGB values is significant.

D3. Modification 3:

With each of embodiment hereinabove, individual colors of pixels are classified into representative color regions by means of weighted distance index values C(i,j) calculated from equation (7a) or equation (7b). Other index values representing difference in color for which weights are determined for each representative color can be used for classifying individual colors also. For example, individual colors can be classified according to angle index values V(i,j) calculated with the following equation (8a) or equation (8b), or on distance index values D(i,j) calculated with the following equation (9a) or equation (9b). Individual colors can be classified according to the weighted distance index values C(i,j) calculated from these angle index values V(i,j) and distance index values D(i,j).

$$V(i,j)=\{|Rv_{Ref}(i)-Rv(j)|+|Gv_{Ref}(i)-Gv(j)|+|Bv_{Ref}(i)-Bv(j)|\}\times k1(i) \quad (8a)$$

$$V(i,j)=[\{Rv_{Ref}(i)-Rv(j)\}^2+\{Gv_{Ref}(i)-Gv(j)\}^2+\{Bv_{Ref}(i)-Bv(j)\}^2]\times k1(i) \quad (8b)$$

$$D(i,j) = \frac{|R_{Ref}(i) - R(j)| + |G_{Ref}(i) - G(j)| + |B_{Ref}(i) - B(j)|}{k2(i)} \quad (9a)$$

$$D(i,j) = \frac{\sqrt{\{R_{Ref}(i) - R(j)\}^2 + \{G_{Ref}(i) - G(j)\}^2 + \{B_{Ref}(i) - B(j)\}^2}}{k2(i)} \quad (9b)$$

Where angle index values V(i,j) given by equation (8a) or equation (8b) are used, the i-th representative color region expands as the decrease of k1(i). Where distance index values D(i,j) given by equation (9a) or equation (9b) are used on the other hand, the i-th representative color region shrinks as the decrease of k2(i).

By varying the ratio of k1(i) and k2(i) for each representative color, it is possible to determine, for each representative color, whether angle or distance is given priority when carrying out classification of individual colors. In this case, it is acceptable, for example, to give priority to distance for representative colors with low lightness for which change of hue due to noise of RGB values is significant, while giving priority to angle for representative colors with high lightness for which change of hue is noticeable.

D4. Modification 4:

With each of the embodiment hereinabove, area segmentation is performed on an RGB color image. The invention is also applicable where an image targeted for area segmentation is a monochrome image or an image composed of specific color components. In general, by determining an appropriate index value representing color difference in an image, it is possible to carry out area segmentation in accordance with the invention, provided that the image can be segmented into a plurality of areas. In the case of monochrome images, lightness difference may be used for the color difference.

D5. Modification 5:

With each of the embodiment hereinabove, image segmentation technique of the present invention is applied to the inspection of printed circuit board. In general, the image segmentation technique of the present invention is applicable for inspection of any object subject to testing of which defect appears on a captured image of the object. The present invention is applicable for the inspection of the object by means of capturing the image of the object and detecting a defect of the object on the basis of segmentation result of the image. The present invention is applicable for inspection method or inspection apparatus which detects a defect of an object such as a semiconductor wafer, a glass substrate, a film and a printed matter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for segmentation of an image into a plurality of image areas, the method comprising the steps of:
   (a) acquiring a plurality of representative colors, the representative colors being predetermined irrespective of a color histogram of the image;
   (b) determining a weight associated with each of the plurality of representative colors;
   (c) calculating weighted color difference index values associated with the plurality of representative colors according to the weights, respectively, with respect to each pixel constituting the image, the weighted color difference representing difference in color between an individual color representing color of each pixel constituting the image and each of the plurality of representative colors; and
   (d) performing segmentation of the image into the plurality of image areas according to the weighted color difference index values by classifying the individual color into one of a plurality of representative color regions associated with the plurality of representative colors.

2. A method according to claim 1 wherein the step (b) includes the steps of:
   (b1) generating a histogram of number of pixels which constitute the image and whose individual colors are present on a line passing through at least two representative color regions among the plurality of representative color regions; and
   (b2) adjusting the weight of at least one representative color associated with the at least two representative color regions by analyzing the histogram.

3. A method according to claim 1 further comprising the steps of
   (e) determining whether result of segmentation into the image areas performed at the step (d) is appropriate; and
   (f) adjusting the weight of at least one representative color among the plurality of representative colors according to the result of segmentation when the result of segmentation performed at the step (d) is determined inappropriate.

4. A method according to claim 1 wherein the step (c) includes the steps of:
   calculating an angle index value associated with an angle between an individual color vector representing the individual color and a representative color vector representing each of the plurality of individual colors in a predetermined color space;
   calculating a distance index value associated with a distance between the individual color and each of the plurality of representative colors in the predetermined color space; and
   weighting at least one of the distance index value and the angle index value associated with the same representative color in accordance with the weight, and calculating the weighted color difference index value for each of the plurality of representative colors based on the distance index value and the angle index value after the weighting, in relation to the individual color.

5. A method according to claim 4 wherein the step (b) includes the steps of:
   (b1) generating a histogram of number of pixels which constitute the image and whose individual colors are present on a line passing through at least two representative color regions among the plurality of representative color regions; and
   (b2) adjusting the weight of at least one representative color associated with the at least two representative color regions by analyzing the histogram.

6. A method according to claim 4 further comprising the steps of:
   (e) determining whether result of segmentation into the image areas performed at the step (d) is appropriate; and
   (f) adjusting the weight of at least one representative color among the plurality of representative colors according to the result of segmentation when the result of segmentation performed at the step (d) is determined inappropriate.

7. An apparatus for segmentation of an image into a plurality of image areas comprising:
   a representative color acquisition unit configured to acquire a plurality of representative colors, the representative colors being predetermined irrespective of a color histogram of the image;
   a representative color weight determination unit configured to determine a weight associated with each of the plurality of representative colors;
   a weighted color difference calculation unit configured to calculate weighted color difference index values associated with the plurality of representative colors according to the weights, respectively, with respect to each pixel constituting the image, the weighted color difference representing difference in color between an individual color representing color of each pixel constituting the image and each of the plurality of representative colors; and
   an area segmentation unit configured to perform segmentation of the image into the plurality of image areas according to the weighted color difference index values by classifying the individual color into one of a plurality of representative color regions associated with the plurality of representative colors.

8. A method of inspecting a test object of which a defect appears on a test image captured by imaging the test object, the method comprising the steps of:
   (a) acquiring the test image of the test object;
   (b) dividing the test image into a plurality of image areas; and
   (c) detecting the defect in accordance with a result of division of the test image into the plurality of image areas, wherein the step (b) includes the steps of acquiring a plurality of representative colors, the representative colors being predetermined irrespective of a color histogram of the image;

determining a weight associated with each of the plurality of representative colors;

calculating weighted color difference index values associated with the plurality of representative colors according to the weights, respectively, with respect to each pixel constituting the test image, the weighted color difference representing difference in color between an individual color representing color of each pixel constituting the test image and each of the plurality of representative colors; and performing segmentation of the test image into the plurality of image areas according to the weighted color difference index value by classifying the individual color into one of a plurality of representative color regions associated with the plurality of representative colors.

9. A apparatus of inspecting a test object of which a defect appears on a test image captured by imaging the test object, the apparatus comprising:

a test image acquisition unit configured to acquire the test image of the test object;

an image division unit configured to divide the test image into a plurality of image areas; and a testing unit configured to detect the defect in accordance with a result of division of the test image into the plurality of image areas, wherein the image division unit includes:

a representative color acquisition unit configured to acquire a plurality of representative colors, the representative colors being predetermined irrespective of a color histogram of the image;

a representative color weight determination unit configured to determine a weight associated with each of the plurality of representative colors;

a weighted color difference calculation unit configured to calculate weighted color difference index values associated with the plurality of representative colors according to the weights, respectively, with respect to each pixel constituting the test image, the weighted color difference representing difference in color between an individual color representing color of each pixel constituting the test image and each of the plurality of representative colors; and an area segmentation unit configured to perform segmentation of the test image into the plurality of image areas according to the weighted color difference index values by classifying the individual color into one of a plurality of representative color regions associated with the plurality of representative colors.

10. A method according to claim 2 wherein the step (b2) includes the step of:

adjusting the weight of the at least one associated color so as to cause a boundary of the at least two representative color regions to come to a local minimum point of the histogram.

* * * * *